United States Patent [19]

Bivens

[11] Patent Number: 5,744,052
[45] Date of Patent: Apr. 28, 1998

[54] AZEOTROPE-LIKE COMPOSITIONS CONTAINING DIFLUOROMETHANE, PENTAFLUOROETHANE, AND CARBON DIOXIDE

[75] Inventor: Donald Bernard Bivens, Kennett Square, Pa.

[73] Assignee: E. I. du Pont de Nemours and Company, Wilmington, Del.

[21] Appl. No.: 634,526

[22] Filed: Apr. 17, 1996

Related U.S. Application Data

[63] Continuation of Ser. No. 274,886, Jul. 14, 1994, abandoned.
[51] Int. Cl.$^6$ .................................................... C09K 5/04
[52] U.S. Cl. .......................... 252/67; 62/114; 510/410; 510/411
[58] Field of Search .......................... 252/67; 510/410, 510/411; 62/114

[56] References Cited

U.S. PATENT DOCUMENTS

| | | | |
|---|---|---|---|
| 4,978,467 | 12/1990 | Shankland et al. | 252/69 |
| 5,162,381 | 11/1992 | Richard et al. | 521/89 |
| 5,169,873 | 12/1992 | Behme et al. | 521/114 |
| 5,254,600 | 10/1993 | Blanpied et al. | 521/125 |
| 5,275,751 | 1/1994 | Decaire et al. | 252/67 |

FOREIGN PATENT DOCUMENTS

| | | | |
|---|---|---|---|
| 41 16 274 A1 | 11/1992 | Germany. | |
| 4116274 | 11/1992 | Germany. | |
| 92/11338 | 7/1992 | WIPO. | |
| 92/16597 | 10/1992 | WIPO. | |
| WO 93/04139 | 3/1993 | WIPO | C09K 5/06 |
| WO94/17153 | 8/1994 | WIPO | C09K 5/04 |

*Primary Examiner*—Christine Skane

[57] ABSTRACT

Refrigerant compositions are disclosed which are non-flammable when vapor charged and which perform as well as compositions of 50 weight percent difluoromethane and 50 weight percent pentafluoroethane.

3 Claims, No Drawings

AZEOTROPE-LIKE COMPOSITIONS CONTAINING DIFLUOROMETHANE, PENTAFLUOROETHANE, AND CARBON DIOXIDE

This is a continuation of application Ser. No. 08/274,886 filed Jul. 14, 1994, now abandoned.

FIELD OF THE INVENTION

This invention relates to refrigerant compositions that are nonflammable and non-ozone depleting.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, refrigerant is often lost during operation through leaks in shaft seals, hose connections, soldered joints and broken lines. In addition, the refrigerant may be released to the atmosphere during maintenance procedures on refrigeration equipment. If the refrigerant is not a single component or an azeotrope, the refrigerant composition may change when leaked or discharged to the atmosphere from the refrigeration equipment, causing the refrigerant to become flammable or to have poor refrigeration performance.

Also, it is not uncommon that when a refrigerant is charged from a cylinder to a refrigeration system, that the vapor from the cylinder, instead of the liquid, is charged to the refrigeration system. This is referred to as "vapor charging". It is important that a refrigerant that is nonflammable in its liquid form also be nonflammable in the vapor above the liquid. Unless the refrigerant is a single component or an azeotrope with the same liquid and vapor compositions, the act of vapor charging adds still another requirement for non flammability, as vapor charged into a system condenses to form liquid, and the liquid can have a different equilibrium vapor composition. Therefore, it is important that refrigerant mixtures have liquid and vapor compositions that are nonflammable, and if vapor charged, have a resulting vapor composition in the system that is also nonflammable.

Another environmental concern is the role of fluorocarbons in the "greenhouse effect". The greenhouse effect refers to the warming of the Earth's climate that takes place when atmospheric gases, which are relatively transparent to visible light and allow sunshine to reach the Earth, trap heat by absorbing infrared radiation released by the Earth.

There is presently no universally accepted methodology for combining all relevant factors into a singe global warming potential for emissions of gases such as HFCs. One approach is to define the greenhouse effect of a compound in terms of a potential to enhance global warming relative to a known standard. One such definition is known as a global warming potential (GWP), which is the ratio of incremental radiative warming resulting from an emission of a gas, over the lifetime of the gas in the atmosphere, to the calculated warming that would result from a release of the same mass of reference gas carbon dioxide.

While HFCs have a zero ozone depletion potential, some HFCs may have a GWP that may be undesirable. Accordingly, there is also a demand for the development of refrigerants that have a low ozone depletion potential while at the same time having a low GWP.

SUMMARY OF THE INVENTION

The present relates to the discovery that certain refrigerant mixtures of difluoromethane (HFC-32) and pentafluoroethane (HFC-125), which are nonflammable in the liquid and vapor phases, but which are flammable in the vapor phase when vapor charged, may be made nonflammable by forming a ternary refrigerant composition through the addition of small amounts of carbon dioxide ($CO_2$) to the binary refrigerant composition. The resultant ternary refrigerant compositions are azeotrope-like, and perform acceptably as refrigerants. Furthermore, the inventive refrigerant compositions have a lower GWP than certain mixtures of HFC-32 and HFC-125.

DETAILED DESCRIPTION

Refrigerant compositions of HFC-32 and HFC-125 are known. An example of such a refrigerant composition is a liquid mixture of 50 weight percent HFC-32 and 50 weight percent HFC-125. The vapor above this liquid is rich in HFC-32, containing about 53 weight percent HFC-32. The flammable boundary for mixtures of HFC-32 and HFC-125, according to the ASTM E-681-85 flammability test at 100° C., is about 54–55 weight percent HFC-32 and 45–46 weight percent HFC-125. If a liquid composition of 50 weight percent HFC-32 and 50 weight percent HFC-125 is vapor charged, that is, the vapor above this liquid composition is charged to a refrigeration system, the vapor in the charged system is about 56 weight percent HFC-32 and 44 weight percent HFC-125, which is flammable.

It has been discovered that the addition of small amounts of $CO_2$ prevents the vapor phase of a 50/50 weight percent liquid composition of HFC-32/HFC-125 from entering the flammable region, even when vapor charged. It has also been discovered that liquid compositions of HFC-32 and HFC-125 having greater than 50 weight percent HFC-32 may be made non flammable in the vapor phase through the addition of $CO_2$ to the liquid composition.

Included in this invention are compositions of 49–55 weight percent HFC-32, 40–49 weight percent HFC-125 and 0.5–5 weight percent $CO_2$. These compositions are also azeotrope-like.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than about 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of HFC-32, HFC-125 and $CO_2$, such that after 50 weight percent of an original composition is evaporated or boiled off to produce a remaining composition, the difference in the vapor pressure between the original composition and the remaining composition is 10 percent or less.

It is possible to characterize, in effect, a constant boiling admixture which may appear under many guises, depending upon the conditions chosen, by any of several criteria:

* The composition can be defined as an azeotrope-like composition of A, B, C (and D ...) since the very term "azeotrope-like" is at once both definitive and limitative, and requires that effective amounts of A, B, C (and D ...) for this unique composition of matter which is a constant boiling composition.

* It is well known by those skilled in the art, that, at different pressures, the composition of a given azeotrope-like composition will vary at least to some degree, and changes in pressure will also change, at least to some degree, the boiling point temperature. Thus, an azeotrope-like composition of A, B, C (and D ...) represents a unique type of relationship but with a variable composition which depends on temperature and/or pressure. Therefore, compositional ranges, rather than fixed compositions, are often used to define azeotrope-like composition.

* The composition can be defined as a particular weight percent relationship or mole percent relationship of A, B, C (and D ...), while recognizing that such specific values point out only one particular relationship and that in actuality, a series of such relationships, represented by A, B, C (and D ...) actually exist for a given azeotrope-like composition, varied by the influence of pressure.

* An azeotrope-like composition of A, B, C (and D ...) can be characterized by defining the compositions as an azeotrope-like composition characterized by a boiling point at a given pressure, thus giving identifying characteristics without unduly limiting the scope of the invention by a specific numerical composition, which is limited by and is only as accurate as the analytical equipment available.

The azeotrope-like compositions of the present invention can be prepared by any convenient method including mixing or combining the desired amounts. A preferred method is to weigh the desired component amounts and thereafter combine them in an appropriate container.

Further, it has been discovered that the inventive compositions of HFC-32, HFC-125 and $CO_2$ perform well in air conditioning. The data in the Examples below show that for various inventive compositions of HFC-32, HFC-125 and $CO_2$, when compared with a 50/50 weight percent mixture of HFC-32 and HFC-125, there is no change in compression ratio, a slight increase in energy efficiency ratio, increases in capacity, slight increases in discharge pressure, and small changes in discharge temperature. Accordingly, the addition of $CO_2$ to mixtures of HFC-32 and HFC-125 provide mixtures that perform well as refrigerants, and which are nonflammable.

EXAMPLE 1

Impact of Vapor Leakage on Vapor Pressure at 25° C.

A vessel is charged with an initial composition at 25° C., and the vapor pressure of the composition is measured. The composition is allowed to vapor leak from the vessel, while the temperature is held constant at 25° C., until 50 weight percent of the initial composition is removed, at which time the vapor pressure of the composition remaining in the vessel is measured. The results are summarized below.

| Refrigerant Composition | 0 wt % evaporated psia (kPa) | 50 wt % evaporated psia (kPa) | Vapor pressure % change in vapor pressure |
|---|---|---|---|
| HFC-32/HFC-125/$CO_2$ | | | |
| 50.0/48.0/2.0 | 257 (1772) | 244 (1680) | 5.1 |
| 55.0/40.0/5.0 | 283 (1954) | 254 (1750) | 10.2 |
| 52.0/46.0/2.0 | 257 (1774) | 244 (1684) | 5.1 |
| 50.0/49.5/0.5 | 243 (1677) | 239 (1650) | 1.6 |

The results of this Example show that these compositions are azeotrope-like because when 50 wt. % of an original composition is removed, the vapor pressure of the remaining composition is within about 10% of the vapor pressure of the original composition, at a temperature of 25° C.

EXAMPLE 2

Refrigerant Performance

The following Table shows the performance of the inventive refrigerant compositions. The data are based on the following conditions.

| Evaporator temperature | 45° F. (7.2° C.) |
| Condenser temperature | 115° F. (46.1° C.) |
| Subcool temperature | 100° F. (37.8° C.) |
| Return gas temperature | 60° F. (15.6° C.) |

The refrigeration capacity is based on a compressor with a fixed displacement of 3.5 cubic feet per minute and 70% volumetric efficiency. Capacity is intended to mean the change in enthalpy of the refrigerant in the evaporator per pound of refrigerant circulated, i.e. the heat removed by the refrigerant in the evaporator per time.

EER is the energy efficiency ratio, which is an indication of the energy efficiency of the refrigerant, measured in BTUs per hour per watt.

| Refrig. Comp. | Discharge Press. Psia | Dis. °T. F. | Comp. Ratio | Relative Capacity | EER |
|---|---|---|---|---|---|
| HFC-32/HFC-125 | | | | | |
| 50/50 | 403 | 184 | 2.79 | 527 | 12.95 |

-continued

| Refrig. Comp. | Discharge Press. Psia | Dis. °T. F. | Comp. Ratio | Relative Capacity | EER |
|---|---|---|---|---|---|
| HFC-32/HFC-125/$CO_2$ | | | | | |
| 49/50.5/0.5 | 407 | 184 | 2.78 | 530 | 12.93 |
| 50/48/2 | 422 | 186 | 2.79 | 548 | 12.89 |
| 50/49.5/.05 | 408 | 187 | 2.79 | 532 | 12.96 |
| 51/48/1 | 413 | 186 | 2.79 | 539.4 | 12.99 |
| 52/46/2 | 423 | 185 | 2.79 | 551 | 12.89 |
| 52/47/1 | 413.5 | 186.7 | 2.79 | 541.1 | 13.02 |
| 53/45/2 | 423.3 | 188.8 | 2.79 | 553.0 | 13.05 |
| 54/43/3 | 433 | 189 | 2.79 | 565 | 13.08 |
| 55/40/5 | 452 | 192 | 2.79 | 585 | 13.13 |

These data show that the compositions of the invention of HFC-32, HFC-125 and $CO_2$ perform as well as compositions of 50/50 weight percent of HFC-32 and HFC-125.

EXAMPLE 3

Vapor Charging

Samples of the refrigerant compositions are prepared, and the content of the liquid and the vapor are analyzed. The refrigerant compositions are vapor charged to a cylinder, and the content of that vapor in the cylinder is measured. The vapor which exists after vapor charging into the cylinders is tested for flammability using the ASTM E-681-85 test at 100° C. The compositions which include $CO_2$ in the liquid phase are all nonflammable according to this test.

| REFRIGERANT COMPOSITION AT 77F (WEIGHT PERCENTS) | | |
|---|---|---|
| Liquid Comp. | Vapor Comp. | Vapor Comp. (after vapor charging) |
| HFC-32/HFC-125 | | |
| 50/50 | 52.8/47.2 | 55.4/44.6 |
| HFC-32/HFC-125/$CO_2$ | | |
| 50/49.5/0.5 | 52.3/46.3/1.36 | 53.7/42.8/3.5 |
| 49/50.5/0.5 | 51.4/47.3/1.3 | 52.9/43.7/3.4 |
| 51/48/1 | 52.8/44.6/2.6 | 53.0/40.3/6.7 |
| 52/47/1 | 53.7/43.6/2.6 | 53.8/39.5/6.7 |
| 53/45/2 | 53.7/41.1/5.2 | 51.6/35.7/12.6 |
| 55/40/5 | 52.9/34.9/12.2 | 46.2/27.7/26.1 |
| 54/43/3 | 53.7/38.7/7.6 | 49.8/32.5/17.6 |
| 50/48/2 | 51.0/43.8/5.2 | 49.3/38.1/12.6 |
| 52/46/2 | 52.8/42.0/5.2 | 50.9/36.5/12.6 |

EXAMPLE 4

GWP

GWP is a relative measure of the possible warming effect in the surface and the troposphere arising due to the emissions of a greenhouse gas. GWP takes into account both the instantaneous radiative forcing due to a single pulsed emission of that gas, as well as its lifetime within the atmosphere. It is thus related to the emissions of greenhouse gases and their lifetimes. The GWP of a well-mixed gas is defined formally as the time-integrated commitment to radiative forcing from the instantaneous release of 1 kilogram of a trace gas expressed relative to that from the release of 1 kilogram of $CO_2$.

It has been discovered that the addition of $CO_2$ to compositions of HFC-32 and HFC-125 lowers the GWP of those compositions because (1) $CO_2$ has a lower GWP than HFC-32 and HFC-125 and (2) use of $CO_2$ allows for relatively higher amounts of HFC-32 to be present, which has a lower GWP than HFC-125, without causing the composition or its vapor to be flammable. The GWPs of the compositions following are calculated from the GWP values of the components.

| COMPOSITION | GWP |
|---|---|
| HFC-32/HFC-125 | |
| 50/50 | 2000 |
| HFC-32/HFC-125/$CO_2$ | |
| 50/49.5/0.5 | 1983 |
| 51/48/1 | 1938 |
| 52/47/1 | 1910 |
| 53/45/2 | 1850 |
| 54/43.5/2.5 | 1803 |
| 55/42/3 | 1758 |
| 55/40/5 | 1690 |

Thus it may be seen that $CO_2$ reduces the GWP of compositions of HFC-32 and HFC-125.

The novel compositions of this invention, including the azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

While only limited ranges of examples of the addition of $CO_2$ to compositions of HFC-32 and HFC-125 have been discussed, it should be understood that the present invention is not so limited, but covers the broader concept that the addition of $CO_2$ to compositions of HFC-32 and HFC-125 reduces the flammability and reduces the GWP of any composition of HFC-32 and HFC-125. Therefore, also included in this invention are compositions of from 5–90 weight percent HFC-32, 5–90 weight percent HFC-125, and 5–90 weight percent carbon dioxide.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

I claim:

1. An azeotrope-like composition consisting essentially of 49–55 weight percent difluoromethane, 40–49.5 weight percent pentafluoroethane and about 0.5–3 weight percent carbon dioxide, said composition having a liquid and a vapor phase, wherein when 50 weight percent of an initial composition is evaporated the vapor pressure of the composition changes by less than about 10 percent and further wherein said composition is nonflammable in the vapor phase.

2. A process for producing refrigeration, comprising condensing a composition of claim 1 and thereafter evaporating said composition in the vicinity of a body to be cooled.

3. A process for producing heat comprising condensing a composition of claim 1 in the vicinity of a body to be heated, and thereafter evaporating said composition.

* * * * *